United States Patent
Akram et al.

(10) Patent No.: US 7,933,253 B2
(45) Date of Patent: Apr. 26, 2011

(54) RETURN ROUTABILITY OPTIMISATION

(75) Inventors: Ammad Akram, Reading (GB); Makis Kasapidis, Berkshire (GB)

(73) Assignee: Panasonic Corporation, Osaka (JP)

( * ) Notice: Subject to any disclaimer, the term of this patent is extended or adjusted under 35 U.S.C. 154(b) by 723 days.

(21) Appl. No.: 11/663,316

(22) PCT Filed: Sep. 20, 2004

(86) PCT No.: PCT/GB2004/004008
§ 371 (c)(1),
(2), (4) Date: Mar. 3, 2008

(87) PCT Pub. No.: WO2006/032826
PCT Pub. Date: Mar. 30, 2006

(65) Prior Publication Data
US 2008/0310375 A1      Dec. 18, 2008

(51) Int. Cl.
*H04W 4/00* (2009.01)
(52) U.S. Cl. ........ 370/338; 370/389; 370/331; 713/153; 713/155; 713/156; 713/168; 713/175; 726/3; 726/15
(58) Field of Classification Search .............. 370/338
See application file for complete search history.

(56) References Cited

U.S. PATENT DOCUMENTS

| | | | | |
|---|---|---|---|---|
| 5,416,842 | A * | 5/1995 | Aziz | 380/30 |
| 6,826,690 | B1 * | 11/2004 | Hind et al. | 713/186 |
| 7,046,647 | B2 * | 5/2006 | Oba et al. | 370/331 |
| 7,143,435 | B1 * | 11/2006 | Droms et al. | 726/3 |
| 7,193,987 | B2 * | 3/2007 | Vilander | 370/338 |
| 7,254,630 | B1 * | 8/2007 | Daude et al. | 709/224 |
| 7,389,412 | B2 * | 6/2008 | Sharma et al. | 713/153 |
| 7,400,611 | B2 * | 7/2008 | Mukherjee et al. | 370/338 |
| 7,428,226 | B2 * | 9/2008 | Adrangi et al. | 370/331 |
| 7,451,312 | B2 * | 11/2008 | Medvinsky et al. | 713/168 |
| 7,502,929 | B1 * | 3/2009 | Schnizlein et al. | 713/168 |
| 7,554,967 | B1 * | 6/2009 | Varadhan et al. | 370/352 |

(Continued)

FOREIGN PATENT DOCUMENTS

WO    WO 01/54379    7/2001

OTHER PUBLICATIONS

T. Kivinen, Safenet, Inc. "Design of he MOBIKE protocol; draft-ieft-mobike-design-00.txt" IKEV2 Mobility and Multihoming—Internet Draft, Jun. 24, 2004, pp. 1-19, XP002329135 Retrieved from the Internet: URL:http://www. ietf.org/proceedings/04aug/I-D/draft-ietf-mobike-design-00.txt> retrieved on May 23, 2006.

(Continued)

*Primary Examiner* — Kent Chang
*Assistant Examiner* — Magdi Elhag
(74) *Attorney, Agent, or Firm* — RatnerPrestia

(57) ABSTRACT

A method of managing switching of a virtual private network (VPN) tunnel termination point from a first address to a second address. The VPN operates between a fixed network node and a mobile node which defines the termination point. The address of the mobile mode is switched from the first address to the second address and a notification from the mobile node to the fixed node is sent to indicate that the address of the mobile has changed from the first address to the second address. Verification of the trustworthiness of the second address is also then made. A searching manager for performing the method is also disclosed.

13 Claims, 3 Drawing Sheets

U.S. PATENT DOCUMENTS

| | | | |
|---|---|---|---|
| 7,602,786 B2 * | 10/2009 | Dommety et al. | 370/392 |
| 2002/0018456 A1 * | 2/2002 | Kakemizu et al. | 370/338 |
| 2006/0155853 A1 * | 7/2006 | Nesz et al. | 709/227 |

OTHER PUBLICATIONS

Zao J. et al., A Public-Key Based Secure Mobile IP12, Mobicom. Proceedings of the Annual International Conference on Mobile Computing and Networking, Sep. 26, 1997, pp. 173-184, XP000764777, abstract.

Aura Microsoft Research T: Cryptographically Generated Addresses (CGA), IETF Standard-Working-Draft, Internet Engineering Task Force, IETF, CH. vol. send No. 6, Apr. 16, 2004, XP015027371 ISSN:0000-0004, abstract.

* cited by examiner

RETURN ROUTABILITY OPTIMISATION

FIELD OF THE INVENTION

The present invention relates to mobile communications and in particular it relates to a method for optimising return routability (RR) during the switching of Virtual Private Network (VPN) tunnels.

BACKGROUND

FIG. 1 shows an example of a roaming Mobile Node MN such as a possibly multi-homed portable telephone with General Packet Radio Service (GPRS) and IEEE802.11 Wireless Local Area Network (WLAN) interfaces, connecting back to its corporate network N via a security gateway SGW through an Internet Protocol Security Protocol (IPSec) protected tunnel VPNT1 or VPNT2 across the insecure public Internet I. The mobile node MN might use the IPSec tunnel to access information within its corporate network or it might tunnel back all its external traffic to utilise the security services, for example a home firewall, offered by its corporate network security gateway SGW.

In the first instance, the mobile node MN roams into a foreign network FN1 where it is allocated or configures itself an IP address IP1 associated with its GPRS interface. The mobile node MN(IP1) and security gateway SGW engage in Internet Key Exchange (IKE) signalling to configure an IPSec tunnel VPNT1 through which data traffic can pass securely. This complex step involves the creation of an IKE Security Association (IKE SA) after the mobile node MN(IP1) and security gateway SGW have performed mutual authentication. The security association to form the IPSec tunnel (VPN connection) is created under the protection of the IKE SA.

Owing to mobility, the mobile node MN disconnects from the first foreign network FN1 and attaches itself (step s1) to a second foreign network FN2 where the mobile node MN is allocated or configures itself a new or additional IP address IP2 on its GPRS interface. Alternatively, mobility results in the mobile node MN coming under the coverage of both GPRS and WLAN in the second foreign network FN2 resulting in the mobile node MN simultaneously supporting both IP addresses IP1 and IP2 on its GPRS and WLAN interfaces respectively. In the first case, the mobile node MN wishes to maintain the VPN connection to the security gateway SGW irrespective of its changing IP address whereas in the second case, the mobile node MN wishes to use the most efficient available connection. In both cases, the mobile node MN may have to reform a VPN connection between the security gateway SGW and the second IP address IP2, a cumbersome process possibly requiring user interaction.

A new approach being investigated by the Internet Engineering Task Force (IETF) IKEv2 Mobility and Multi-homing (MOBIKE) Working Group is for the mobile node to use explicit signalling to inform the security gateway peer about the updated address of the mobile node and thereby effect the switching of the VPN connection from IP1 to IP2. This switching of VPN connections between IP addresses is effectively a re-direction of data intended for the mobile node. A problem with this approach is that it can be exploited to launch so-called "third party bombing" or denial of service (DoS) attacks whereby a valid peer re-directs its traffic to some third party with the intent of flooding the victim with large amounts of traffic.

The IKE security association between the mobile node and the security gateway protects the explicit MOBIKE signalling to inform the security gateway of the mobile node's new address such that the security gateway knows that the signalling has come from an authenticated source. However, the security gateway still needs to be assured that the IP address contained within the update signalling belongs to the mobile node and any subsequent re-direction to the new address will not result in a third party bombing attack.

As part of the MOBIKE protocol, it has been proposed to perform return routability (RR) tests to ensure that the mobile node is reachable at the claimed address carried within the MOBIKE update payload. The return routability tests are proposed to be along the lines of the dead-peer-detection (DPD) procedure whereby peers exchange empty informational packets. Appropriate modifications are required to ensure that the IKE SA is not deleted if the DPD test to an updated address fails.

There are several problems with the RR/DPD test. It is possible within the current IKEv2 DPD procedure for a real authenticated node that has turned malicious to reply to a DPD test packet without processing the request packet. An enhancement is required to DPD whereby the initiator has to insert a cookie or nonce tied to the claimed IP address that is returned by the IKE responder. IKEv2 implementations with window size of 1 will prohibit DPD tests whilst some other IKEv2 exchanges are ongoing. Additionally, RR/DPD could delay data re-direction owing to the round trip delay involved in executing the procedure.

It would be advantageous for the mobile node to have alternative mechanisms to assert ownership of claimed IP addresses to security gateways without incurring the signalling overhead of RR/DPD.

SUMMARY OF THE INVENTION

The present invention seeks to remove the delay and signalling overhead imposed by the RR/DPD process in asserting mobile node ownership of a claimed IP address that has been allocated to the mobile node through both stateful configuration such as Dynamic Host Configuration Protocol (DHCP) configuration and stateless address configuration.

According to the present invention there is provided a method of managing switching of a virtual private network (VPN) tunnel termination point from a first address to a second address, wherein the VPN operates between a fixed network node and a mobile node which defines the termination point, the method comprising the steps of:

switching the address of the mobile node from the first address to the second address;

sending notification from the mobile node to the fixed network node that the address of the mobile node has changed from the first address to the second address;

verifying from the notification that the second address is an address which can be trusted not to belong to a third party.

According to the present invention there is further provided a virtual private network (VPN) tunnel termination point switching manager comprising:

switching means arranged to switch, in use, the termination point of a VPN from a first address to a second address, wherein the VPN operates between a fixed network node and a mobile node which defines the termination point;

notification sending means arranged to send, in use, notification from the mobile node to the fixed network node that the address of the mobile node has changed from the first address to the second address;

verification means arranged, in use, to verify from the notification that the second address is an address which can be trusted not to belong to a third party.

The present invention provides a system which enables a fixed network node to trust that a new address which a mobile node claims to be using cannot belong to a third party being targeted with unwanted traffic. As a result, there is no need to employ a return routability or dead peer detection test which would otherwise be used to verify that the mobile node is indeed at the claimed address. Instead, data traffic to the new address is commenced immediately, so reducing delays.

BRIEF DESCRIPTION OF THE DRAWINGS

Examples of the invention for both stateful and stateless address configuration will now be described with reference to the accompanying drawings in which like parts are designated like reference numerals and in which.

DETAILED DESCRIPTION

Figure 2:
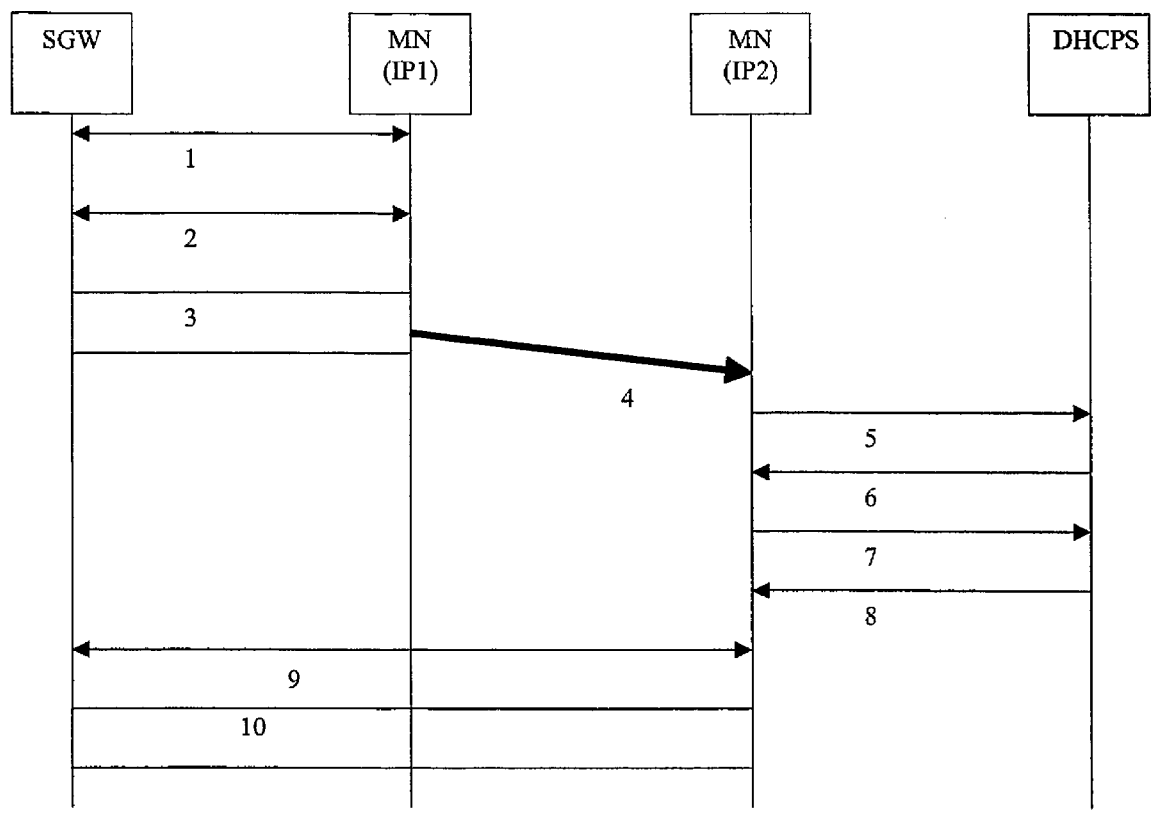
FIG. 2 illustrates steps 1 to 10 of the signal flow diagram required to maintain an ongoing VPN connection in the case of stateful address configuration.

The process of completing VPN tunnel switching between two networks as a result of explicit MOBIKE update signalling in the case of stateful address configuration occurs in a number of distinct steps whose timing is shown in FIG. 2.

Figure 1:
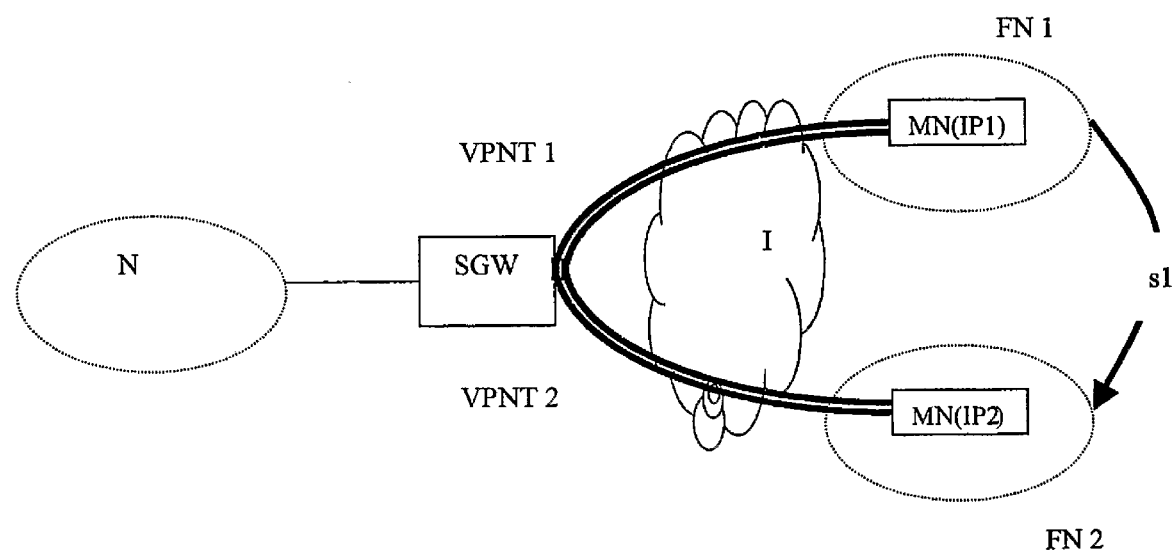
FIG. 1 schematically illustrates a mobile node changing its ongoing VPN connection to a security gateway as a result of moving between two networks.

An example of stateful configuration is by means of DHCP which is a client/server protocol whereby a DHCP server provides stateful configuration management of client devices including allocation of IP addresses on a temporary basis from a database. Alternatively, stateful configuration may be by means of autoconfiguration. In the example of FIG. 1, each foreign network FN1, FN2 could contain a DHCP server that allocates addresses IP1 and IP2 to a mobile node MN to be used as the terminating point of VPN tunnels VPNT1 and VPNT2. The basic concept of the invention starts with the mobile node requesting an IP address from the DHCP server using the same identity as used in the creation of its IKE SA with the security gateway. In allocating an address in its response, the DHCP server additionally provides a certificate to the mobile node that binds the allocated address with this identity. The certificate can be included within any MOBIKE update signalling between the mobile node and security gateway to provide confidence to the security gateway that the claimed update address was indeed allocated to the mobile node and does not belong to an unsuspecting victim. Accordingly, the security can re-direct data from one IP address to another without performing a RR/DPD test.

The process of VPN tunnel switching between two networks in the case of stateful address configuration is now described in detail below, beginning with the dynamic creation of a VPN tunnel between a security gateway SGW and a mobile node MN in a foreign network FN1.

The first step 1 is IKE phase one message exchange. The security gateway SGW and the mobile node MN run the IKE protocol to establish an IKE SA that is a secure negotiation channel used for mutual authentication between the security gateway SGW using an identity IDsgw and MN using an identity IDmn. Depending on whether IKE or IKEv2 is run, this particular step typically comprises exchange of around 4-6 messages.

In the second step 2 the IKE SA protects the VPN setup. The IKE SA is used to protect signalling that establishes a pair of unidirectional IPSec SAs. The IPSec SAs are the actual negotiation of specific IPSec parameters for the VPN tunnel such as authentication header (AH)/encapsulating security protocol (ESP) authentication/encryption methods. This step typically involves exchange of another 2-4 messages.

In the third step 3, a VPN tunnel VPNT1 is setup via the foreign network FN1 to the mobile node MN. An IPSec SA has associated with it traffic selectors such as IP addresses/ports. For outbound packets, any packets with matching destination addresses/ports are given the protection of the relevant IPSec SA, in this case resulting in forwarding of encrypted packets to the mobile node MN at address IP1.

The fourth step 4 is the mobile node MN changing network from FN1 to FN2 owing to the network's mobility. This requires the mobile node MN to configure a new address that can be used on its new point of network attachment. It is now assumed that MN undergoes stateful address configuration with the assistance of a local DHCP server DHCPS.

In the fifth step 5 the mobile node MN sends out a multicast DHCP Solicit message, using a link-local IPv6 address, to locate an available DHCP server DHCPS. The mobile node MN lays out its requirement for a DHCP server to provide address configuration information and additionally provide a certificate that will bind the allocated addressing information to an identity used by the mobile node MN.

In the sixth step 6 any server DHCPS that can meet the mobile node's requirements responds with an Advertise message.

In the seventh step 7 the mobile node MN then chooses one of the servers DHCPS and sends a Request message to the server DHCPS asking for confirmed assignment of addresses and other configuration information using the same identity IDmn as presented to the security gateway SGW in creating the IKE SA. It is assumed that like any other DHCP client, the mobile node MN has a set of keys that have been distributed both to the mobile node MN and DHCP server DHCPS through some out-of-band mechanism that is considered beyond the scope of the DHCPv6 specification. The exchanged keys are used to provide authentication of the source and contents of DHCP messages to the other peer. The transmitting peer computes a keyed HMAC-MD5 hash from its DHCP message that, if reproduced exactly by the receiving peer, confirms that the original DHCP message has not been modified in transit.

The eighth step 8 is for the server DHCPS to respond with a Reply message that contains the confirmed address IP2 and configuration for the mobile node MN. The integrity of the Reply message from the DHCP server is protected by use of a keyed HMAC-MD5 hash.

The contents of the certificate provided to the mobile node MN are: the IP address allocated to the mobile node MN, the mobile node MN identity as used in the IKE SA setup, a timestamp indicating when DHCP server DHCPS was allocated an IP address and the lifetime of the address, a DHCP server public key, a signature by DHCP and a DHCP certificate. The DHCP server signs the certificate with its private key to provide a binding between the allocated address and its timestamp with the mobile node MN identity. A third party can verify this binding using the DHCP server public key that is included in the certificate. The certificate also contains another certificate that verifies that the public key provided by the DHCP server DHCPS does indeed belong to the DHCP server DHCPS. Typically, a third party trusted by both the security gateway SGW and the DHCP server DHCPS will sign this second certificate. An alternative method involving additional signalling is for the security gateway SGW to extract the DHCP public key using Public Key Infrastructure (PKI) when presented with the DHCP server identity.

In the ninth step 9, the mobile node MN issues a MOBIKE update signalling request from the new network FN2 to switch the VPN tunnel from IP1 and IP2. The DHCP certificate is inserted into this message. The security gateway SGW uses the DHCP server public key to verify that the new address being reported by the mobile node MN was indeed allocated by the DHCP server DHCPS to MN identity IDmn.

The final step 10 is for the mobile node MN to receive data through the modified VNP tunnel VNPT2 through foreign network FN2. The security gateway SGW can now re-direct data for the mobile node MN to the new address IP2 in the knowledge that this re-direction is unlikely to cause denial of service to an unsuspecting victim. The security gateway SGW returns an Acknowledge message to the mobile node MN to confirm acceptance of the updated address. The DHCP certificate has obviated the need for the security gateway SGW to perform any RR/DPD tests before the re-direction can take effect.

Figure 3:
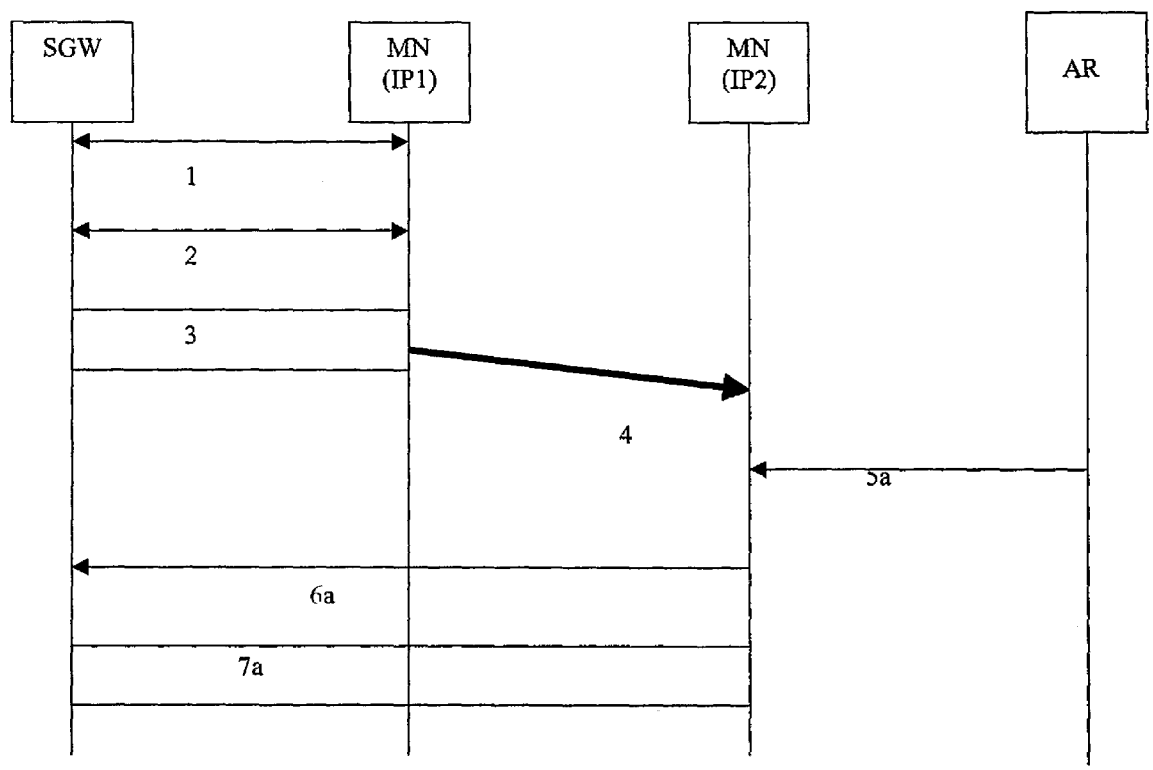
FIG. 3 illustrates steps 1 to 7 of the signal flow diagram required to maintain an ongoing VPN connection in the case of stateless address configuration.

The process of completing VPN tunnel switching between two networks as a result of explicit Mobike update signalling in the case of stateless address configuration occurs in a number of distinct steps whose timing is shown in FIG. 3.

Stateless address configuration enables a host to generate its own address using a combination of locally available information and information advertised by access routers. Access routers advertise prefixes that identify the subnet(s) associated with a link, while nodes generate a link local address that uniquely identifies an interface on a subnet. A globally routable address is formed by combining the link local address and subnet prefix after the link local address has been proven to be unique, i.e., not already in use by another node on the link. The basic concept of the invention for stateless address configuration is for the mobile node to use as a source address in outgoing packets an address that is extremely unlikely to be configured for use by a third party. The process of using Cryptographically Generated Addresses (CGA) is one such technique for binding the address configured by a mobile node to a cryptographic key in its possession. The CGA concept is extended in the present invention by using parameters pre-agreed between a mobile node and security gateway for inclusion in the address generation process. This provides additional confidence to the security gateway that re-direction of data intended for the mobile node to this source address is unlikely to lead to a denial of service attack to another unsuspecting node.

The process of completing VPN tunnel switching in the case of stateless address configuration will be described in detail below.

The first step 1, in common with the stateful example in FIG. 2, is to establish an IKE SA. Additionally, the security gateway SGW comes into possession of the mobile node's public key and agreement is reached on the parameters that will be included in the CGA process. These include the 8-bit collision counter and the 128-bit auxiliary parameters. Currently, 128 randomly selected bits are suggested for the auxiliary parameters. However, different parameters may also be used. In the present invention, one option for the auxiliary parameters is for mobile node MN and security gateway SGW to agree on a fixed set of 128-bits. Another option is for the mobile node MN and security gateway SGW to agree on which sections of the keying material derived during the creation of the IKE SA and IPSec SA's will be used as the auxiliary parameters. Typically, the IKE SA keying material comprises 5 keys with a further 4 keys for each IPSec SA pair. There may be multiple IPSec pairs under one IKE SA.

The second 2, third 3 and fourth steps are the same as for the stateful example in FIG. 2. A VPN tunnel is created between the security gateway SGW and the mobile node MN before the mobile node MN changes networks owing to mobility.

The fifth step 5a is for router advertisements from the access router AR on the new network FN2 to provide the mobile node MN with information on the valid prefixes that can be used to configure globally routable addresses.

The mobile node MN uses the pre-agreed number of bits from the IKE/IPSec SA keying material, the pre-agreed collision counter, its public key and an advertised prefix to generate a global address with the use of hash functions in accordance with the CGA procedure. The mobile node MN prepares the payload of the next packet that it wants to send to the security gateway SGW from the new foreign network FN2 using the newly configured CGA address after it has concluded all neighbour discovery functions associated with stateless configuration, for example, Duplicate Address Detection.

The sixth step 6a is for the security gateway SGW to start sending packets from the new foreign network FN2 using the CGA source address. The security gateway SGW receives the first packet with a source address which is different to the expected source address and verifies that the source address is a CGA address generated using the mobile node's public key and pre-agreed values. Following, it is assumed that the security gateway SGW is able to remove dependence of tunnel outer address and simply use the security parameter index (SPI) in locating the correct IPSec SA.

In the seventh step 7a, the mobile node MN receives data through the modified VPN tunnel VPNT2 via the new foreign network FN2. In the event of successful verification of the CGA address, the security gateway SGW uses the source address as a destination address in packets destined to the mobile node MN and proceeds to forward data to that address without running a return routability check for that address.

The invention is claimed is:

1. A method of managing switching of a virtual private network (VPN) tunnel termination point from a first address to a second address, wherein the VPN operates between a fixed network node and a mobile node which defines the termination point, the method comprising the steps of:
   Requesting that a third party, which is trusted by the fixed network node, allocate an address to the mobile node using an identity used by the mobile node for the VPN tunnel with the fixed network node;
   Allocating the second address as a new address to the mobile node by the trusted third party;
   Providing the mobile node with a certificate, containing the second address and the identity, by the trusted third party;
   switching an address of the mobile node from the first address to the second address;
   sending a notification containing the certificate from the mobile node to the fixed network node that the address of the mobile node has changed from the first address to the second address; and
   verifying from the certificate that the second address has been allocated to the mobile node by the trusted third party.

2. The method according to claim 1, wherein the trusted third party is a Dynamic Host Configuration Protocol (DHCP) server.

3. The method according to claim 1, wherein the identity is determined during establishment of the VPN tunnel.

4. The method according to claim 1, wherein the certificate contains a public key.

5. The method according to claim 2, wherein the certificate contains a timestamp showing when the DHCP server allocated the second address and a lifetime for which the second address has been allocated to the mobile node.

6. The method according to claim 5, wherein the certificate contains a digital signature using a private key of the DHCP server that serves as a binding between the second address, the identity used by the mobile node and the timestamp.

7. The method according to claim 2, wherein the mobile node requests the services of the DHCP server capable of providing the certificate through use of modified DHCP signalling.

8. The method according to claim 7, wherein the modified DHCP signalling is a new option OPTION_ADDR_CERT included in a DHCP Request message for address allocation from the mobile node to the DHCP server.

9. The method according to claim 1, wherein Internet Key Exchange version 2 (IKEv2) signalling is used to notify the fixed network node of the mobile node's second address and contains the DHCP certificate.

10. A virtual private network (VPN) tunnel termination point switching system for switching from a first address to a second address, wherein the VPN tunnel operates between a fixed node and a mobile node which defines the termination point, the switching system comprising:
Requesting means arranged to request a third party, which is trusted by the fixed network node, to allocate an address to the mobile node using an identity used by the mobile node for the VPN tunnel with the fixed network node;
Allocating means arranged to allocate the second address as a new address to the mobile node by the trusted third party;
Providing means arranged to provide the mobile node with a certificate, containing the second address and the identity, by the trusted third party;
switching means arranged to switch the address of the mobile node from the first address to the second address;
notification sending means arranged to send a notification containing the certificate from the mobile node to the fixed network node, the notification indicating that the address of the mobile node has changed from the first address to the second address; and
verification means arranged to verify from the certificate that the second address has been allocated to the mobile node by the trusted third party.

11. The switching system according to claim 10, wherein Internet Key Exchange (IKE) signalling is used to notify the fixed network node that the address of the mobile node has changed from the first address to the second address.

12. The method according to claim 3, wherein the certificate contains the identity used by the mobile node during an address configuration process.

13. The method according to claim 1, further comprising:
providing, by the trusted third party to the mobile node, a further certificate that verifies the trusted third party;
providing, by the mobile node, the further certificate to the fixed network node; and
verifying the trusted third party by the fixed network node, using the further certificate.

* * * * *